Patented Nov. 22, 1932

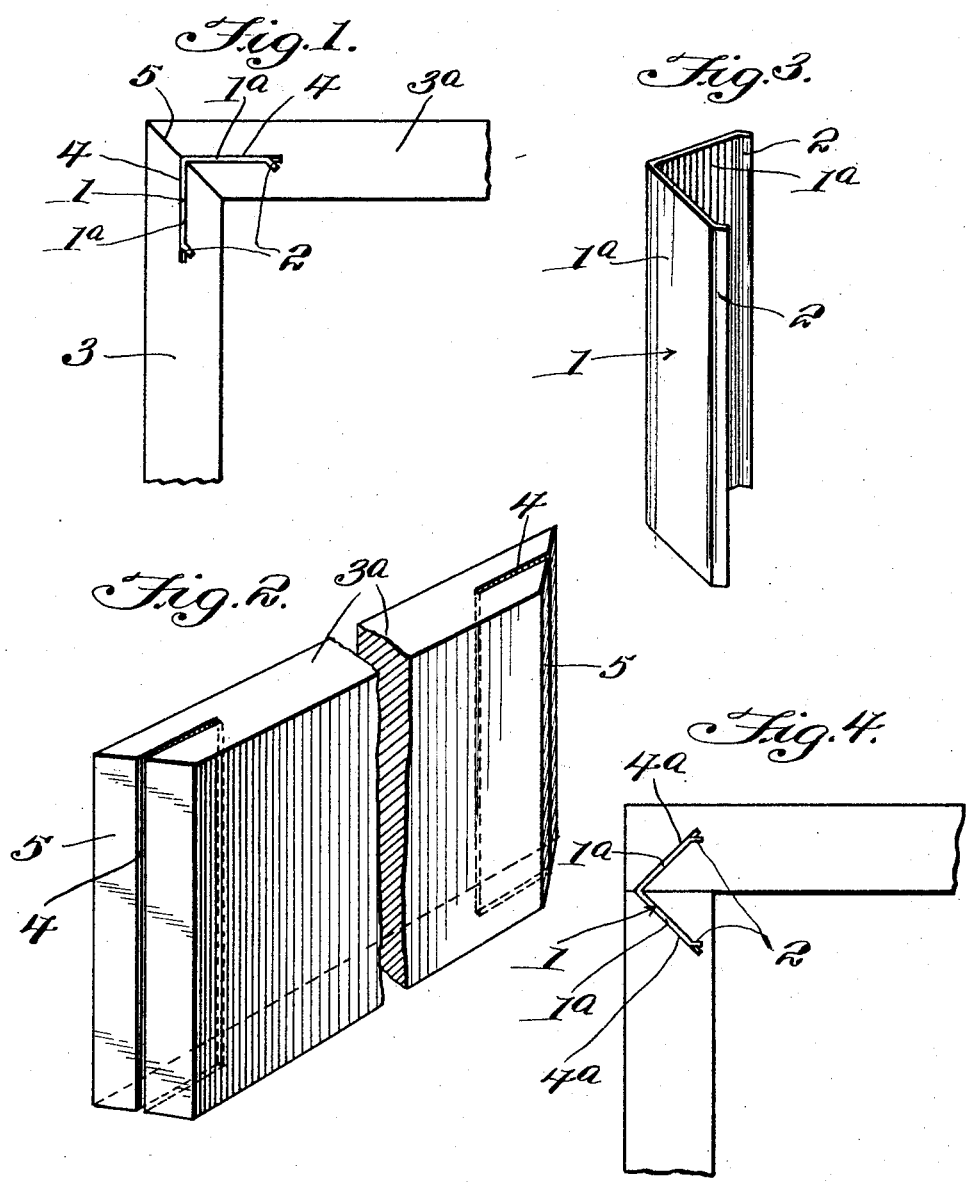

1,888,523

UNITED STATES PATENT OFFICE

EDWARD B. WILLIAMSON, OF PETERSBURG, VIRGINIA

STRUCTURAL JOINT

Application filed June 8, 1929. Serial No. 369,399.

My invention relates to improvements in joints for structures.

More particularly it relates to a joint structure for securing together the meeting ends or edges of wood structures and is especially adapted for securing together the parts of a miter-joint, although it may be effectively applied for permanently securing together the parts of a butt joint or other type of joint.

The object of the invention is to provide such a structure embodying certain new and novel features.

A further object is to provide a joint structure which reinforces the walls of the joint by the provision of a fastening device extending with the grain of the wood in preformed kerfs substantially centrally of the parts of the joint, and having flanged edges for forming their own grooves.

Another object is the provision of such a joint structure having the above characteristics which include means for drawing the joints tightly together as it is being applied to the joint or driven in.

Other objects will appear hereinafter.

The invention consists in the features, combination, and arrangement of parts hereinafter described and particularly pointed out in the claim.

Referring to the drawing:

Figure 1 is a top plan view of a miter joint structure embodying my invention.

Fig. 2 is an end elevation of one of the parts to be joined showing the kerf or groove extending from top to bottom thereof.

Fig. 3 is a view of the fastener or locking element.

Fig. 4 is a view of a modified form of joint embodying my invention.

In the drawing, 1 is the fastener or locking element comprising a strip of sheet metal bent into L shape in cross-section and having its longitudinal side edges bent over as shown at 2.

The parts 3 and 3a to be joined may be of wood or like material and are provided with kerfs or grooves 4 extending throughout their meeting faces 5 from top to bottom thereof, the kerfs preferably being of a depth slightly greater than the walls 1a of the locking device.

The kerfs are disposed to register when the meeting faces are in proper contact, and are of a width preferably no greater than the thickness of the locking element so that the locking element will fit therein snugly.

As shown in Figs. 1 and 2, the kerfs are disposed longitudinally so that they extend with the grain of the wood and the fastener thus serves as a reinforcement and strengthener of the parts to be joined.

The operation and formation of the joint structure will be apparent, the locking element being of a shape to exactly and snugly fit the kerfs except for the bent over or flanged edges 2 for which no preformed receiving opening is provided. The fastener or locking element therefore must be driven into the receiving kerfs, the bent over edges cutting their own grooves in the walls of the kerf and bearing against the same will urge and press the parts into close engagement at the joint.

This is because the walls of the fastener at the sides thereof opposite to the direction in which the overturned edges are bent cannot give because they are constrained in position by the walls of the kerf which they fit exactly.

Fig. 4 shows a modified form of my invention in which a butt joint is fastened by means of the fastener 1 having the overturned flanges 2, the fastener being received in grooves 4a or kerfs in the parts to be joined, the flanges 2 cutting their own grooves and urging the joint tightly together due to the close fit of the locking device in the kerfs. In this instance, however, the fastener receiving kerfs do cross the grain.

It will be seen that the main purpose of the flanges 2 is to lock the parts together, said flanges biting into the wood and preventing separating of the members.

The overturned edges 2 are not bent at right angles to the L-shaped body, but are at an obtuse angle greater than 80° with respect thereto. That is, they are on a slant or incline so that when they cut their way in the groove when being driven in, they will do so on a slant. This angular slanting disposition of the fastener as it is driven in has a tendency to pull from the heel of the L-shaped fastener which tends to draw the material together at the joint.

This device is particularly adapted for fastening the corners of drawers, boxes and similar wooden constructions, but it may be used in other constructions.

The edges 2, by reason of their obtuse angle, assure absence of tendency to separation of the joint as they are driven in.

I claim:

A joint structure including a fastening element comprising a strip of sheet metal bent into L-shape in cross-section, said fastening element being disposed to fit in kerfs preformed in the parts to be joined, said kerfs registering at the meeting faces of the parts to be joined, said fastening element having its edges bent over at an inclination forming an obtuse angle relative to the body thereof to be driven downwardly into the walls forming the kerfs in applying the fastening device downwardly into the kerfs in forming the joint, said obtuse angled edges causing no tendency to separation of the joint as the fastener is driven in, said parts being drawn together at the joint by means of the obtuse inclination of the bent edges pulling outwardly from the heel or bend of the L-shaped fastener in being driven into place.

In testimony whereof, I affix my signature.

EDWARD B. WILLIAMSON.